United States Patent [19]

Lee

[11] Patent Number: 4,564,071

[45] Date of Patent: Jan. 14, 1986

[54] HORSE SHOE

[75] Inventor: James M. Lee, South Orange, N.J.

[73] Assignee: Barrett F. Kalb, Roseland, N.J. ; a part interest

[21] Appl. No.: 666,992

[22] Filed: Oct. 31, 1984

[51] Int. Cl.⁴ .............................................. A01L 3/00
[52] U.S. Cl. ...................................... 168/19; 168/20; 168/25
[58] Field of Search ..................... 168/17, 18, 19, 20, 168/25, DIG. 1

[56] References Cited

U.S. PATENT DOCUMENTS

| | | | |
|---|---|---|---|
| 1,041,959 | 10/1912 | Casserleigh | 168/18 |
| 1,116,326 | 11/1914 | Powlowski et al. | 168/20 |
| 1,234,747 | 7/1917 | Frej | 168/19 |
| 1,262,627 | 4/1918 | Borcherts | 168/19 |
| 3,894,585 | 7/1975 | Baum | 168/25 |

*Primary Examiner*—Robert P. Swiatek
*Attorney, Agent, or Firm*—Holman & Stern

[57] ABSTRACT

A nailess horse shoe having a cup shaped configuration open at the rear part, molded of flexible plastics or polyurethyne material having a forwardly extending slot shaped opening in the bottom. A sponge rubber sole is provided on the lower surface on the bottom of the shoe and clamping or tightening members in the form of rod members extend between the lateral side walls and are provided with tightening nuts to draw the lateral side walls towards each other into clamping engagement onto the horse's hoof. A sock is insertable between the hoof and the inner surface of the shoe and a device for attaching weights is provided on the front of the shoe.

10 Claims, 11 Drawing Figures

U.S. Patent   Jan. 14, 1986   Sheet 1 of 3   4,564,071
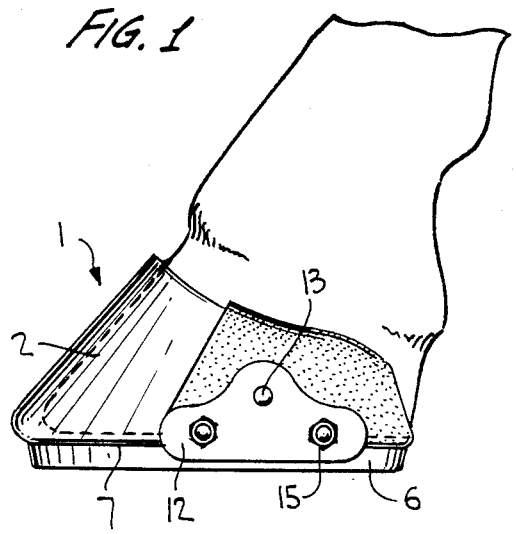
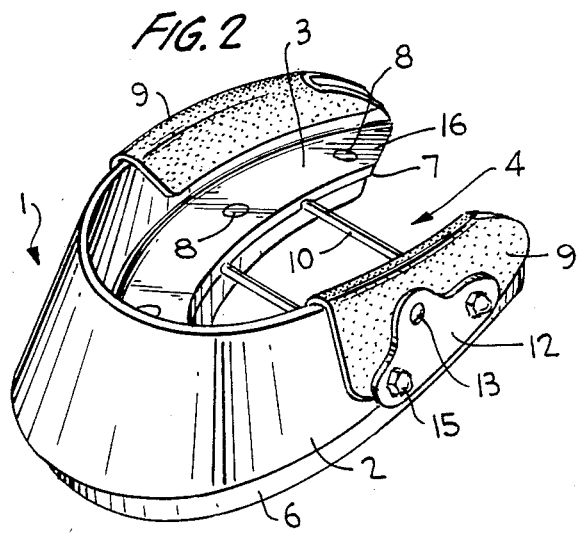
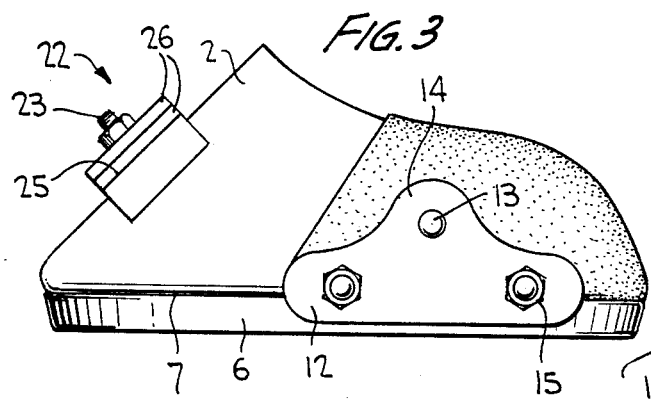
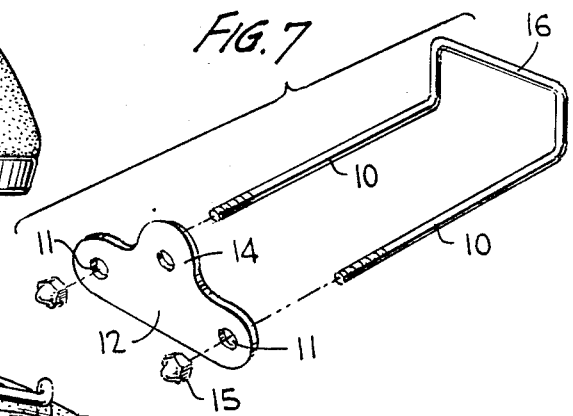
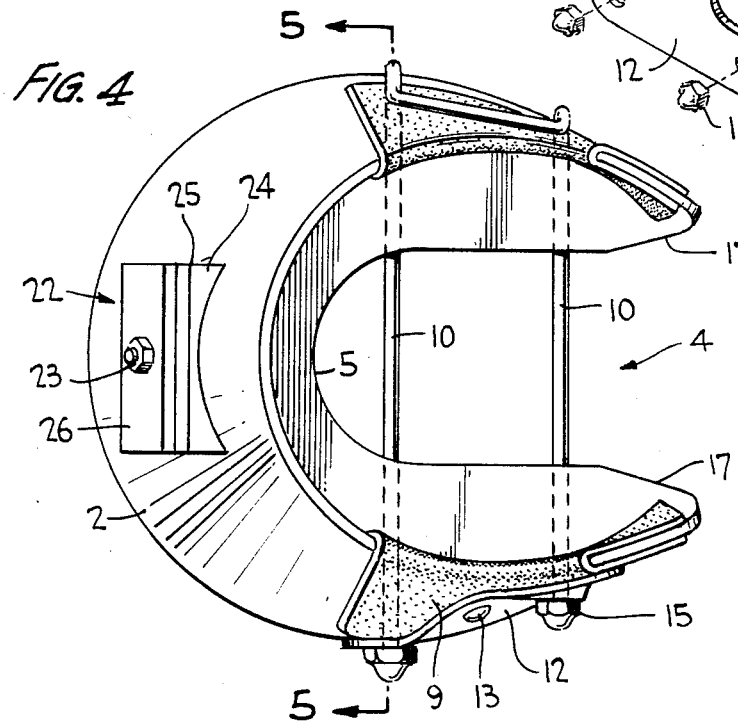

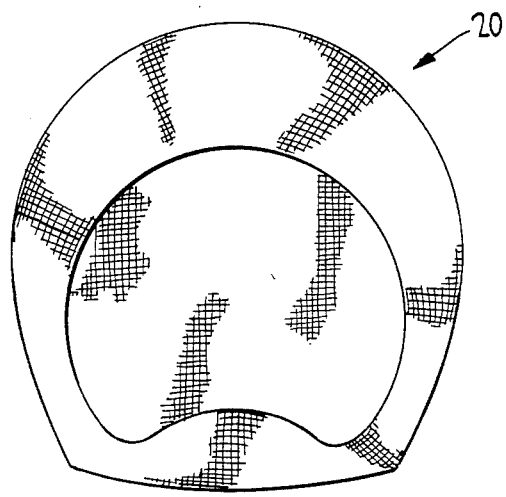
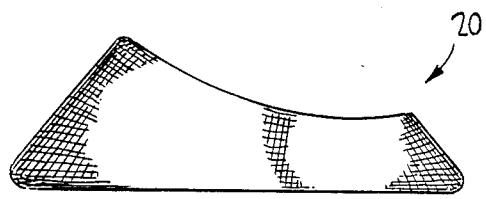
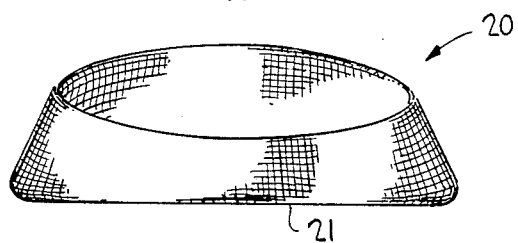
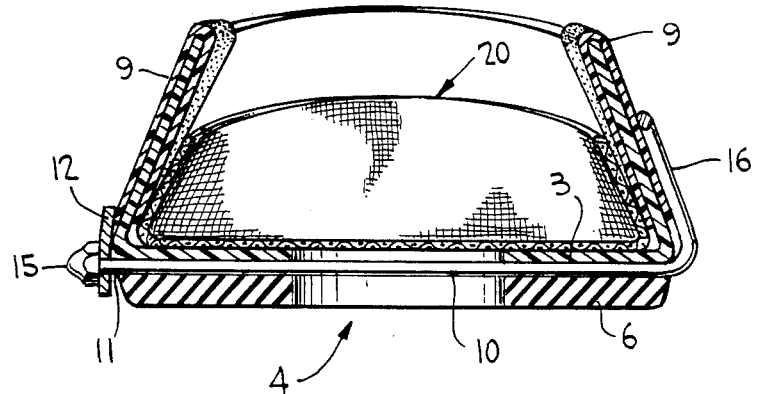

HORSE SHOE

BACKGROUND OF THE INVENTION

1. Field of the Invention

This invention relates to a nailess horse shoe which can be attached to a horse's hoof and retained thereon without the use of nails or screws or any similar type of attaching means which penetrates the horse's hoof.

2. Description of the Prior Art

The type of horse shoe in general use today is a metallic part circular shaped rim which covers the lower edge surface of the horse's hoof and is nailed thereto by nails driven through holes in the bottom of the shoe which penetrate through the horse's hoof and wall thereof and are bent over at the top against the outer upper wall of the hoof. This type of shoe eventually works loose and requires renailing resulting in many instances in enlarged holes through the horse's hoof or too many holes and sometimes cracking or chipping of the hoof. In addition, these shoes have to be put on expertly and with great care to prevent penetrating the sensitive part of the hoof which could be painful to the horse and result in lameness. Previously known metal and other hard surface horse shoes also have hard smooth surfaces which tend to slip, particularly on hard or wet surfaces and thus affect the gripping of the natural hoof or the sure footedness of the horse, which is a particular disadvantage in racing, or pulling, for example.

BRIEF SUMMARY OF THE INVENTION

It is an object of this invention to overcome the above disadvantages of conventional horse shoes.

It is a further object to provide a horse shoe that can be easily applied and removed by non-skilled horse owners or stable hands.

It is a still further object of this invention to provide a new horse shoe which does not require nails driven through the horse's hoof, but nevertheless securely attaches to the hoof without contracture, or tightening of the hoof, yet allowing flexibility while limiting expansion of the hoof.

It is a further object of the invention to provide a new protective horse shoe which protects the frog of the hoof and yet allows it to be free of binding or abrasion by the shoe and a resilient sole to provide a cusion or shock absorbing characteristic.

The above objectives are achieved by the instant invention which provides a horse shoe made of resilient plastic material which substantially but not totally envelopes the hoof and has a resilient sole, such as of crepe rubber material, securely fastened to the bottom thereof. The horse shoe is molded, or otherwise suitably formed to conform to the shape of the hoof on which it is to be used with an opening through the lower wall thereof which is below the central portion and frog of the hoof. The shoe has tightening rods extending through its lower portion transverse to the front to rear axis of the foot so that the shoe can be adjusted somewhat into closer clamping engagement with the hoof, without producing a contractural force thereon or compressing or rubbing the frog. In addition, the tightening members produce a horizontal compression which results in greater stability and preferably comprise two or three pins or rods producing two point fixation which prevents rotation of the shoe around the central vertical axis of the foot.

The instant invention has the advantages of easy application and use by non-skilled owners or horse handlers, shock absorbing and ground gripping features which assist in preventing certain forms of lameness due to shock, and a tightening feature which allows a substantially perfect fit to the horse's hoof and yet avoids undesirable or harmful constriction of sensitive parts of the hoof. In addition, since this novel horse shoe obviates the need for driving nails through the horse's hoof, it positively prevents fungal infections caused by such nailings. The invention is particularly suitable for race horses either flat races or trotters, since two or three year olds are still growing and it is much more difficult to apply and remove metal shoes or other types of shoes which require nailing or constrictural clamping to hold them on the hoof.

In a further embodiment of the invention a horse shoe sock is provided in the form of a cupped shaped member composed of flexible polyurethane or plastic which is reinforced by a nylon or dacron mesh which decreases the streachability of the sock, the sock having a size sufficient to cover approximately the lower third of the horse's hoof all the way around it.

In use, the sock is first applied to the horse's hoof before it is inserted in the nailess shoe of the invention and provides an additional cushion between the shoe and the hoof to function as a shock absorber and/or a liner to facilitate use of a shoe on hoofs of various sizes.

BRIEF DESCRIPTION OF THE DRAWINGS

Further advantages of applicant's invention will become more apparent by reading the following more detailed description with reference to the accompanying drawings wherein:

FIG. 1 is a side elevational view of a horse's foot having a horse shoe of the invention mounted on the hoof thereof;

FIG. 2 is a perspective view of the horse shoe of this invention;

FIG. 3 is a side elevational view of the horse shoe shown in FIG. 1 slightly enlarged;

FIG. 4 is a top plan view of FIG. 3;

FIG. 7 is an exploded view of the tightening device of the invention;

FIG. 8 is a top plan view of a horse shoe sock insertable into the horse shoe of this invention;

FIG. 9 is a side elevational view of the sock of FIG. 8;

FIG. 10 is a side elevational view similar to FIG. 9 but showing an additional rubber padding on the bottom of the sock; and FIG. 11 is a view similar to FIG. 5. showing the sock of FIG. 8 inserted in place therein.

DETAILED DESCRIPTION

Figure 5:
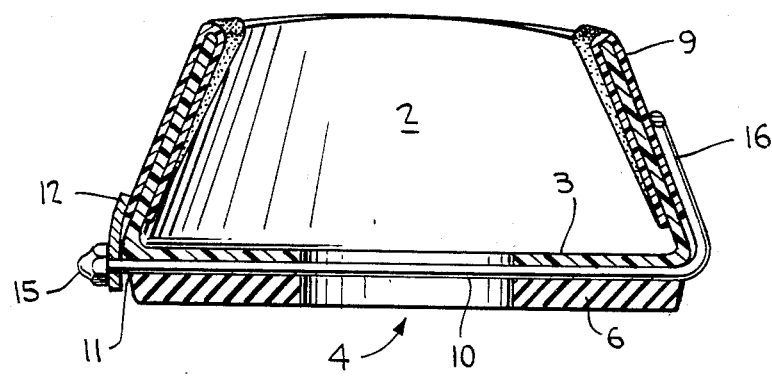
FIG. 5 is a cross-sectional view taken on line 5—5 of FIG. 4.

The nailess horse shoe of this invention is shown in the figures as indicated generally by 1 and comprises a molded plastic or polyurethane plastic shoe 2 that conforms basically over the front wall of the hoof extending at least one half of the height of the front wall of the hoof and having a downwardly sloping contour from the front to the rear of the hoof. The front or forward part of the shoe will therefore taper outwardly downwardly, the tapering gradually decreasing as the side wall passes around to the rear of the hoof. The rear portion is open so that a top view shows a substantially C-shaped configuration. The bottom 3 of the shoe is molded of the same material as the side wall and may be, and preferably is, molded integrally with the side wall to form a substantially horse shoe shaped bottom or base open at the rear and having a forwardly extending open area in the form of a wide slot 4 with a substantially semicircular forward edge portion 5. This configuration provides an essentially open center in the bottom of the shoe beneath the interior portion of the hoof which due to the flexibility of the material can be opened of separated somewhat at the posterior portion to achieve a snap on fit to the hoof when placed thereon from the front to the rear, such as in the manner of a boot or a person's regular shoe. The top surface of the bottom wall will be substantially flat to the hoof and have minimal posterior slope in order to avoid any impingement on or interference with the soft portion of the posterior portion of the horse's hoof. The central opening 4 is open or free for at least one half of the bottom of the horse's hoof.

On the lower surface of the bottom 3 is attached a rubber or crepe rubber sole 6 which is attached by gluing to the plastic shoe with a specific type of glue 7, and for more secure attachment metal studs 8, such as rivets for example (FIG. 2), may be used to assure retention of the sole on the shoe in the event of failure or partial failure of the glue. Preferably there are two stud fastners at the front and two or possibly four studs near the rear portion of the shoe.

A rubber or foam rubber material or pad 9 is glued or cemented over the posterior two thirds of the medial and lateral side walls of the shoe on the inner and outer surfaces thereof to provide protection and a better frictional or compression clamping effect for the shoe when compressed against the walls of the hoof. This material may have a roughened or knurled surface to increase the frictional effect thereof against the hoof.

Figure 6:
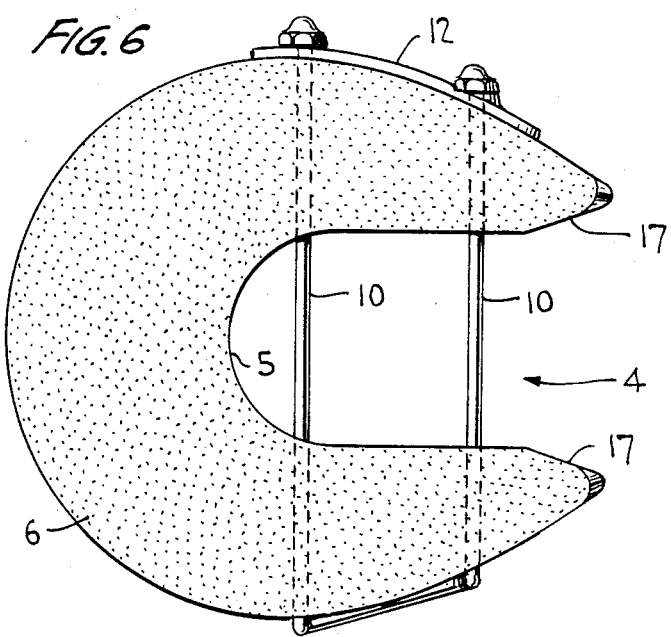
FIG. 6 is a bottom plan view of FIG. 3.

Two adjusting or tightening rods 10 extend through or under the sole or bottom portion 3 of the shoe transverse to the front/rear central axis of the shoe. The rods 10 may be integrally formed from a bent rod such as shown at FIG. 7 so that they have a U-shaped connector 16 at one end which is formed by bending upwardly this end of the rod member. The other ends of the rods 10 have external screw threads thereon and extend through holes 11 in tightening plate 12 at one side of the shoe which is preferably fastened to the side wall by a suitable fastening means such as a rivet 13. Tightening plate 12 extends along the lower portion of the side wall from front to rear for a certain distance and has an upwardly extending bulbous portion or protrusion 14 through the central portion of which the rivet 13 extends. Screw threaded nuts 15, such as capped nuts, for example, are threadedly engaged to the outer protruding ends of rods 10 so that they can be tightened against the outer surface of clamping plate 12 at holes 11 to draw the rods 10 outwardly to place them in tension for the purpose in cooperation with the U-shaped end 16 of drawing the side walls of the shoe together in a manner to clamp the shoe onto the horse's hoof. As shown in FIGS. 4 and 6, the clamping plate 12 is curved from front to rear and from bottom to top so that it conforms closely to the outer curved surface of the lateral side walls of the shoe.

If the bottom wall or sole 3 is of sufficient thickness, holes may be bored therethrough to receive the rods 10, or inverted U-shaped grooves may be provided in the lower surface of the bottom 3 in which part of the rods may be received. Alternatively, the rods 10 may merely extend between the lower surface of bottom 3 and the upper surface of rubber sole 6 in which case they would extend through the layer of glue between these two surfaces.

Although two rods 10 are shown, it should be understood that more than two rods or even one rod may be used in certain circumstances. In the latter case, of course, the U-shape in 16 would be omitted and only a vertical or upwardly bent portion would be provided on the end of a rod 10 to retain this end against the outer wall or lateral side of the shoe. In any case, the size, strength and configuration of the rod members 10 are sufficient to produce the necessary clamping force required to clamp the shoe to the horse's hoof.

As previously described, the opening 4 is provided through the rear portion of the bottom 3 and the lateral side wall at the rear portion thereof extends only to this opening. Preferably, an additional tapering edge 17 is provided extending between the rear most portion of the shoe at a point between the rear most portion and the first rod to provide additional clearance from the horse's hoof to prevent any interference with the flexing of the rear portion of the horse's hoof. Also preferably, this tapering portion tapers upwardly towards the rear to produce a curved contour of the rear edge at each side extending from the lateral side walls to the bottom wall 3 as more clearly shown in FIG. 2.

The clamping member 12 may be made of any suitable material such as aluminum or a heavy duty plastic material. In addition, the lower outer portion of the rubber layer 9 may extend between the inner side of the clamping plate 12 and the outer surface of the side wall of the shoe.

As described above, the unique advantage of the invention is that the shoe is designed and made of material which is light in weight and strong enough yet having some resiliency so that the portions on the side of the central U-shaped opening can be tightened by the tightening rods 10 onto the horse's hoof to prevent the shoe from coming off the hoof even under the stress of the large forces produced by the heavy weight of the horse when running at high speed. In addition there are further features which are unique to this design of shoe for a horse including facilitating the use of medicines which can be placed down the side of the shoe for various purposes including keeping this area clean. The hoof can also be maintained soft to better retain the contour of the hoof, and since this device is removable when necessary, cleaning the hoof is more readily possible to prevent fungal infections and also prevent problems which occur from nailing of a shoe to the hoof.

In a further embodiment of this invention, a horse shoe sock may be inserted into the nailless horse shoe between the hoof and the shoe to provide greater utility for the shoe in fitting various size hoofs. The horse shoe sock of this invention is shown in FIGS. 8, 9, 10 and 11.

The horse shoe sock is generally shown at 20 and comprises a sock shaped to enclose approximately the lower third of the horse's hoof and is composed of a flexible polyurethane or plastic material reinforced by a nylon or dacron mesh which decreases the stretchability of the sock. However, the sock has sufficient flexibility to fit with slight stretching over the horse's hoof to cover the lower portion thereof, which is done prior to insertion of the horse's hoof into the adjustable shoe described above. Similarly to any sock, this sock provides a layer of material between the hoof and the outer shoe. For the intended use of this invention, the instant sock is designed to increase the shock absorption characteristics of the horse shoe by adding a rubber cushion between the hoof and the shoe in the manner of a padded insert which might be added to any shoe. The purpose of this sock is to give greater flexibility to the nailess horse shoe of this invention of the large, medium and small horse shoe sizes, i.e. the shoes can be made to fit a greater range of hoof sizes.

For horses that have hoof problems, such as cuts, minor infections, etc., the horse shoe sock provides protection for the interior surface of the horse's hoof from dirt or other irritating substances or agents as it has semi-total contact characteristics and may be called a hoof protector. The sock is applied to the horse's hoof which is thereafter inserted into the nailess shoe which is properly tightened to be retained on the hoof as described above.

In a further embodiment, shown in FIG. 10, the horse shoe sock of this invention may be provided with a rubber of sponge rubber sole 21 to add a cushion effect. In addition, the entire sock can be made of rubber, or sponge rubber to carry out the above objectives.

In a still further embodiment of applicant's invention, a weighting system can be provided such as shown generally at 22 in FIGS. 3 and 4. This unit is comprised of a bolt or stud 23 extending outwardly from a block 24 in which the bolt may be embedded, the block being made of plastic or suitable material and having a curved inner surface conforming to the curvature of the front wall area of the shoe 2 to which it is secured by gluing or other suitable means. The block may also be molded or formed integrally with the shoe. The outer surface 25 of the block 24 is substantially flat in the embodiment illustrated and weights 26 in the form of flat plate-like members may be clamped onto the top surface thereof 25 by a threaded nut engaging the bolt or stud 23 as shown. This is an additional unique feature of the instant invention which facilitates the addition of weights to a horse's foot as desirable for training or other purposes without requiring permanent attachment to the hoof or any drilling or nailing thereto. With the particular design shown, the amount of weight attached can be readily adjusted by varying the number and weight of the members 26.

In the use of this invention, it is preferable to mount the nailess shoes on the horse's hoof so that the end 16 of the tension rod member is on the inside.

It is understood that the examples and embodiments described herein are for illustrative purposes only and that various modifications or changes in light thereof will be suggested to persons skilled in the art and are to be included within the spirit and purview of this application and the scope of the appended claims.

I claim:

1. A nailess reusable horse shoe comprising:
   a molded polyurethane shoe having a substantially planar bottom and side walls extending upwardly from the outer edges of said bottom inclined at least at the frontal area from the front toward the rear to substantially conform with the inclination of the hoof;
   said bottom and side walls extending from the frontal area rearwardly to form a substantially C-shaped cross-sectional configuration parallel to said bottom and open at the rear;
   each side wall extending upwardly at least one half of the height of the hoof at the frontal part and having a downwardly sloping upper contoured edge toward the rear;
   an opening in said bottom extending from the rear open end forwardly toward the front of said shoe and having a rounded front edge;
   a rubber sole attached to the lower surface of said bottom;
   at least one rod member extending below the upper surface of said bottom between said side walls;
   retaining means on opposite ends of said at least one rod member engaging against respective surfaces of said side walls;
   a clamping plate attached to and conforming with the outer surface of the side wall at one end of said at least one rod member to tension said at least one rod member;
   a hole through said clamping plate through which said one end of said at least one rod member extends;
   a screw thread on said one end of said at least one rod member; and
   a threaded nut operatively engaging said screw thread to draw said side walls on opposite sides of said opening toward each other so that said shoe can be tightened in clamping engagement onto the hoof.

2. A horse shoe as claimed in claim 1 and further comprising:
   two said rod members extending in parallel spaced relationship;
   two said holes in said clamping plate; and
   a screw thread and threaded nut on each rod member.

3. A horse shoe as claimed in claim 2 wherein said rod members are connected at the other ends thereof by an upwardly extending inverted U-shaped member.

4. A horse shoe as claimed in claim 3 wherein said rod and U-shaped members are integrally formed from a single rod element.

5. A horse shoe as claimed in claim 4 and further comprising:
   a layer of rubber like material extending over at least the inner surface of each side wall from the rear edge thereof forwardly for approximately two thirds of the area between said rear edge and the middle of the front of the shoe.

6. A horse shoe as claimed in claim 5 wherein: said opening has side edges extending substantially parallel to each other so that said opening has the form of an elongated slot;
   and said rounded front edge of said opening is substantially semi-circular.

7. A horse shoe as claimed in claim 4 wherein:
   said bottom and side walls are integrally formed;
   said rubber sole is sponge rubber; and
   said sole is attached to said bottom by rubberized glue and rivets.

8. A horse shoe as claimed in claim 7 and further comprising:
   a hoof sock made of flexible polyurethane material reinforced by a mesh of threaded material having a cup shaped configuration with upstanding side walls to cover approximately the lower third of the hoof, so that said sock is interfitted between said hoof and the inside of said shoe.

9. A horse shoe as claimed in claim 4 and further comprising:
means on the front of said shoe to attach weights thereto.

10. A horse shoe as claimed in claim 9 wherein:
said weight attaching means comprises a block member on the front of said shoe formed integrally therewith;
a stud bolt extending from said block;
plate like weights having holes therein to receive said stud; and
a retaining nut on the outer end of said stud bolt.

* * * * *